UNITED STATES PATENT OFFICE.

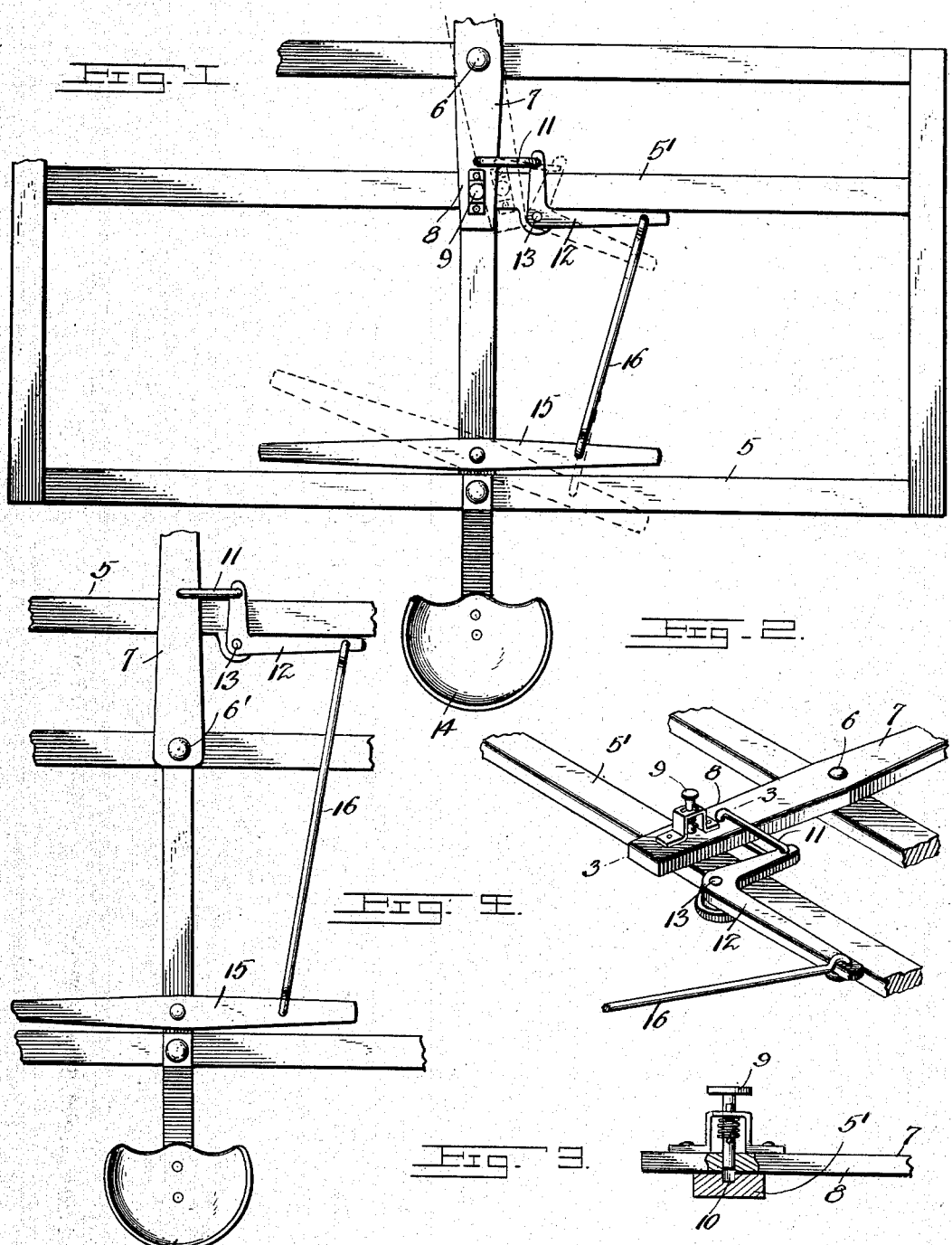

RALPH CARMAN THOMPSON, OF NEWBERRY, INDIANA.

TONGUE ATTACHMENT.

SPECIFICATION forming part of Letters Patent No. 714,261, dated November 25, 1902.

Application filed November 16, 1901. Serial No. 82,594. (No model.)

*To all whom it may concern:*

Be it known that I, RALPH CARMAN THOMPSON, a citizen of the United States, residing at Newberry, in the county of Greene and State of Indiana, have invented a new and useful Tongue Attachment, of which the following is a specification.

My invention relates to certain improvements in cultivators, harrows, and similar agricultural implements, and has for its object to provide an improved tongue attachment to facilitate the guiding of the machine along the row, the tongue being pivoted and connected through a bell-crank lever and link to a centrally-pivoted foot-lever arranged directly in front of and below the driver's seat and serving as a foot-rest for the driver and also as a means for effecting the shifting of the tongue in either direction.

In the accompanying drawings, Figure 1 is a plan view of a tongue-attaching device arranged in accordance with my invention and illustrating sufficient of the frame of a cultivator, harrow, or other agricultural implement to illustrate my invention. Fig. 2 is a perspective view of a portion of the device. Fig. 3 is a transverse sectional elevation on the line 3 3, Fig. 2, illustrating the means employed for locking the tongue in stationary position when desired; and Fig. 4 is a plan view illustrating a modification of the structure.

Similar numerals of reference indicate correponding parts throughout the various figures of the drawings.

5 designates a frame of any suitable size, character, and proportions for the support of the teeth or blade or other operating devices of a cultivator, harrow, planter, fertilizer-distributer, or other agricultural implement. To the forward portion of this frame is fulcrumed at 6 a draft-tongue 7, having a rearwardly-extending tailpiece 8, provided at or near its rear end with a spring locking-bolt 9, which may engage in a recess 10, formed in a transverse bar 5', so that the tongue may be locked rigidly to the frame when desired.

The tongue normally is unlocked and is free to move during the operation of the machine and near its rear end is connected by a link 11 to one arm of a bell-crank lever 12, fulcrumed on a stud 13, carried by the frame.

At the rear portion of the frame, immediately in front of the driver's seat 14, is fulcrumed a foot-lever 15 in convenient position for engagement by the feet of the driver and which may form both a foot-rest and a means for shifting the draft-tongue. To one side of this bar is connected a link 16, extending to the outer and longer arm of the bell-crank lever 12 and so arranged as to transmit to such bell-crank lever any movement of the foot-lever.

The draft-animals are harnessed in the usual or ordinary manner to the draft-pole and through the connection of the pole with the frame draw the apparatus after them. Owing to inequalities in the ground or the surging ahead of one of the animals, the machine may be moved out of line and away from the row which is being operated upon. To correct this movement and to keep the apparatus in a straight line, it is simply necessary for the driver to press upon one or other side of the foot-lever and cause a corresponding movement of the draft-tongue to direct it in the proper line.

The structure may be modified, as illustrated in Fig. 4, by pivoting the tongue at 6' at its rear end and connecting the bell-crank lever to the tongue in advance of the pivot-point, the operation of the parts remaining the same. When it is not desired to employ this tongue-adjusting device, the tongue may be rigidly locked to the frame by the spring-bolt 9, as before described.

It will be understood that the structure herein described may be modified in a variety of ways to render it suitable for connection with machines of different shape, character, and function and that the sizes, proportions, and arrangement of parts may be altered to suit varying conditions of use without sacrificing any of the advantages or departing from the intent and spirit of the invention.

Having thus described my invention, what I claim is—

The combination of the frame, a tongue pivotally connected thereto and having at its rear end a spring-pressed locking-pin for engaging a socket in the frame, a bell-crank lever pivoted to said frame, a foot-rest and operating-lever pivoted to the frame and disposed in the same horizontal plane with the bell-crank lever and the tongue, and links connecting the bell-crank lever to the tongue and to the operating-lever, substantially as specified.

In testimony that I claim the foregoing as my own I have hereto affixed my signature in the presence of two witnesses.

RALPH CARMAN THOMPSON.

Witnesses:
CHAS. H. MARKEL,
H. MINKERT.